(12) United States Patent
Isami et al.

(10) Patent No.: US 11,926,222 B2
(45) Date of Patent: Mar. 12, 2024

(54) ELECTRIC VEHICLE

(71) Applicant: TOYOTA JIDOSHA KABUSHIKI KAISHA, Toyota (JP)

(72) Inventors: Yoichiro Isami, Mishima (JP); Yoshio Itou, Susono (JP); Hiroyuki Amano, Susono (JP); Tatsuya Imamura, Okazaki (JP); Akiko Nishimine, Susono (JP); Hiroaki Ebuchi, Hadano (JP); Hiroaki Kodera, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 422 days.

(21) Appl. No.: 17/354,698

(22) Filed: Jun. 22, 2021

(65) Prior Publication Data

US 2022/0041066 A1 Feb. 10, 2022

(30) Foreign Application Priority Data

Aug. 7, 2020 (JP) .................................. 2020-135172

(51) Int. Cl.
*B60L 15/20* (2006.01)
*B60K 23/02* (2006.01)
*B60K 26/02* (2006.01)

(52) U.S. Cl.
CPC .............. *B60L 15/20* (2013.01); *B60K 23/02* (2013.01); *B60K 26/021* (2013.01); *B60K 2026/025* (2013.01); *B60Y 2200/91* (2013.01); *B60Y 2300/60* (2013.01)

(58) Field of Classification Search
CPC ....... B60L 15/20; B60K 23/02; B60K 26/021; B60K 2026/025; B60Y 2200/91; B60Y 2300/60
See application file for complete search history.

(56) References Cited

U.S. PATENT DOCUMENTS

| 11,654,777 B2 * | 5/2023 | Nishimine | B60L 50/10 701/22 |
| 2013/0131931 A1 * | 5/2013 | Mitsuyasu | B60W 10/06 701/48 |
| 2018/0281619 A1 | 10/2018 | Suzuki et al. | |

FOREIGN PATENT DOCUMENTS

| JP | 2018-166386 A | 10/2018 |
| JP | 2018-191366 A | 11/2018 |

OTHER PUBLICATIONS

Mar. 6, 2023 Notice of Allowance issued in U.S. Appl. No. 17/352,960.

* cited by examiner

Primary Examiner — Gertrude Arthur Jeanglaude
(74) Attorney, Agent, or Firm — Oliff PLC

(57) ABSTRACT

An electric vehicle is configured to be able to perform running by an MT mode that controls an electric motor with a torque characteristic like an MT vehicle having a manual transmission and an internal combustion engine, and running by an EV mode that controls the electric motor with a normal torque characteristic. The electric vehicle includes a mode changeover switch for switching to the running by the MT mode.

2 Claims, 13 Drawing Sheets

ELECTRIC VEHICLE

BACKGROUND

Technical Field

The present disclosure relates to an electric vehicle that uses an electric motor as an engine for running.

Background Art

An electric motor that is used in an electric vehicle (EV) as an engine for running has a significantly different torque characteristic from an internal combustion engine that has been used in a conventional vehicle as an engine for running. Due to the difference in the torque characteristic of the engine, conventional vehicles require transmissions, whereas EVs generally include no transmission. As a matter of course, EVs include no manual transmission (MT) that changes a transmission gear ratio according to a manual operation of a driver. Therefore, there is a significant difference in a sense to driving between driving of a conventional vehicle that includes the MT (hereinafter also referred to as a "MT vehicle") and driving of an EV.

On one hand, the electric motor can control torque relatively easily by controlling the applied voltage and field magnet. Accordingly, the electric motor can have a desired torque characteristic within an operation range by carrying out appropriate control. Utilizing this feature, there has been proposed technology that simulates the torque characteristic peculiar to an MT vehicle by controlling the torque of an EV vehicle.

Patent Literature 1 discloses a technology that makes a pseudo shift change in a vehicle that transmits torque to wheels by a drive motor. In a vehicle according to the Patent Literature 1, torque fluctuation control is performed, which decreases torque of the driver motor by a set fluctuation amount at a predetermined timing and then increases torque again in a predetermined time period. Here, the predetermined timing is specified by a vehicle speed, a degree of accelerator opening, an accelerator opening speed, or a brake depression amount. Thereby, a sense of discomfort given to a driver who is accustomed to the vehicle including a stepped transmission is suppressed.

LIST OF RELATED ART

Patent Literature 1: JP 2018-166386 A

SUMMARY

However, in the technology described above, the timing of torque fluctuation control that simulates the gear change motion cannot be determined by the driver's operation. In particular, for a driver who is accustomed to driving an MT vehicle and feels enjoyment for operating an MT, a pseudo gear change motion that does not involve a manual operation of the driver for gear change may give a sense of discomfort to the sense to driving of the driver.

Considering such circumstances, the inventors relating to the present application are considering providing a pseudo shift device and a pseudo clutch pedal in an EV so that the EV can provide the sense to driving of the MT vehicle. As a matter of course, these pseudo devices are not simply attached to the EV. The inventors relating to the present application are considering making it possible to control an electric motor so that the EV can have a torque characteristic similar to the torque characteristic of the MT vehicle by operating a pseudo shift device and a pseudo clutch pedal.

However, if the operation of the pseudo shift device and the pseudo clutch pedal is constantly required, the ease of driving, which is one of the features of the EV, and the acceleration performance superior to that of the conventional vehicle are impaired. Sometimes the driver wants to drive like an MT vehicle, and sometimes the driver wants to drive as an ordinary EV, depending on the driving environment and the mood of the driver. As a method for realizing such a demand, it is conceivable to prepare two control modes of the electric motor, which are a control mode simulating an MT vehicle (hereinafter, also referred to as an "MT mode") and an ordinary control mode as an EV (hereinafter, also referred to as an "EV mode"), and make these modes switchable.

Since the sense to driving of the MT mode is different from that of the ordinary control mode as an EV, it is required that switching between the MT mode and the EV mode is performed by an intentional operation by the driver. It is expected that switching to the MT mode is performed relatively frequently in various situations such as differences in driving environment, driver's mood, and the case of the driver change. Therefore, if the operation by the driver for switching to the MT mode is complicated, it may cause a sense of annoyance to the driver.

The present disclosure is made in the light of the aforementioned problem. An object of the present disclosure is to provide an electric vehicle that allows the driver to enjoy both driving as an ordinary EV and driving like an MT vehicle, and allows the driver to easily switch to driving like an MT vehicle.

An electric vehicle according to the present disclosure is an electric vehicle that uses an electric motor as an engine for running.

The electric vehicle comprising:
an accelerating pedal;
a pseudo clutch pedal;
a pseudo shift device;
a control device that controls motor torque outputted by the electric motor according to a control mode including two modes that are a first mode and a second mode; and
a mode changeover device that switches the control mode to the first mode by being manually operated.
Wherein the control device includes
a memory, and
a processor,
the memory stores
an MT vehicle model simulating a torque characteristic of drive wheel torque in an MT vehicle including an internal combustion engine that controls torque by operation of a gas pedal and a manual transmission in which a gear stage is switched by operation of a clutch pedal and operation of a shift device, and
a motor torque command map that gives the motor torque corresponding to an operation amount of the accelerating pedal and a rotational speed of the electric motor.
The processor executes
when controlling the electric motor in the first mode,
a process in which the operation amount of the accelerating pedal is accepted as an input of an operation amount of the gas pedal to the MT vehicle model,
a process in which an operation amount of the pseudo clutch pedal is accepted as an input of an operation amount of the clutch pedal to the MT vehicle model, a process in which a shift position of the pseudo shift device is accepted as an input of the shift device to the MT vehicle model, a process in which the drive wheel torque is calculated based on the MT vehicle model from the operation amount of the accelerating pedal, the operation amount of the pseudo clutch pedal, and the shift position of the pseudo shift device, and a process in which the motor torque for giving the drive wheel torque to drive wheels of the own vehicle is calculated.

The processor executes when controlling the electric motor in the second mode, a process in which operation of the pseudo clutch pedal and operation of the pseudo shift device are disabled, and a process in which the motor torque is calculated based on the operation amount of the accelerating pedal and the rotational speed of the electric motor by the motor torque command map.

According to the electric vehicle according to the present disclosure, when controlling the electric motor in the first mode, the driver can enjoy manual operation like an MT vehicle because the operation of the pseudo clutch pedal and the operation of the pseudo shift device are reflected in motor torque calculated by the MT vehicle model. And, when controlling the electric motor in the second mode, the driver can drive the electric vehicle like an ordinary EV and enjoy the ease of driving and the acceleration performance. Furthermore, the driver can easily switch the control mode to the first mode by the operation of the mode changeover switch included in the electric vehicle.

The processor may be configured to executes when the control mode is not the first mode, a determination process which determines whether or not the own vehicle is in a stopped state, the braking pedal is operated, the pseudo clutch pedal is not operated, and the shift position of the pseudo shift device is the neutral position, and a process which rejects switching the control mode to the first mode by the mode switching device while a result of the determination process is negative.

By the processor executes these processes, switching to the MT mode by an erroneous operation is reduced, and the own vehicle can be prevented from being unintentionally operated in the MT mode.

As described above, according to the present disclosure, it is thus possible to provide the electric vehicle, which allows the driver to enjoy both driving as the ordinary EV and driving like an MT vehicle, and allows the driver to easily switch to the driving like an MT vehicle.

DESCRIPTION OF EMBODIMENT

FIG. 1 is a diagram schematically illustrating a configuration of a powertrain system of an electric vehicle according to the present embodiment.

FIG. 2 a diagram illustrating a configuration example of an autonomous driving control system in a case where the electric vehicle according to the present embodiment performs autonomous driving control.

Hereinafter, an embodiment of the present invention will be described with reference to the drawings. Note that when the numerals of the numbers, the quantities, the amounts, the ranges and the like of the respective elements are mentioned in the embodiments shown as follows, the present invention is not limited to the mentioned numerals unless specially explicitly described otherwise, or unless the invention is explicitly specified by the numerals theoretically. Further, the structures and the like that are described in the embodiments shown as follows are not always indispensable to the invention unless specially explicitly shown otherwise, or unless the invention is explicitly specified by the structures and the like theoretically. Note that in the respective drawings, the same or corresponding parts are assigned with the same reference signs, and redundant explanations of the parts are properly simplified or omitted.

1. CONFIGURATION OF ELECTRIC VEHICLE

Figure 1:
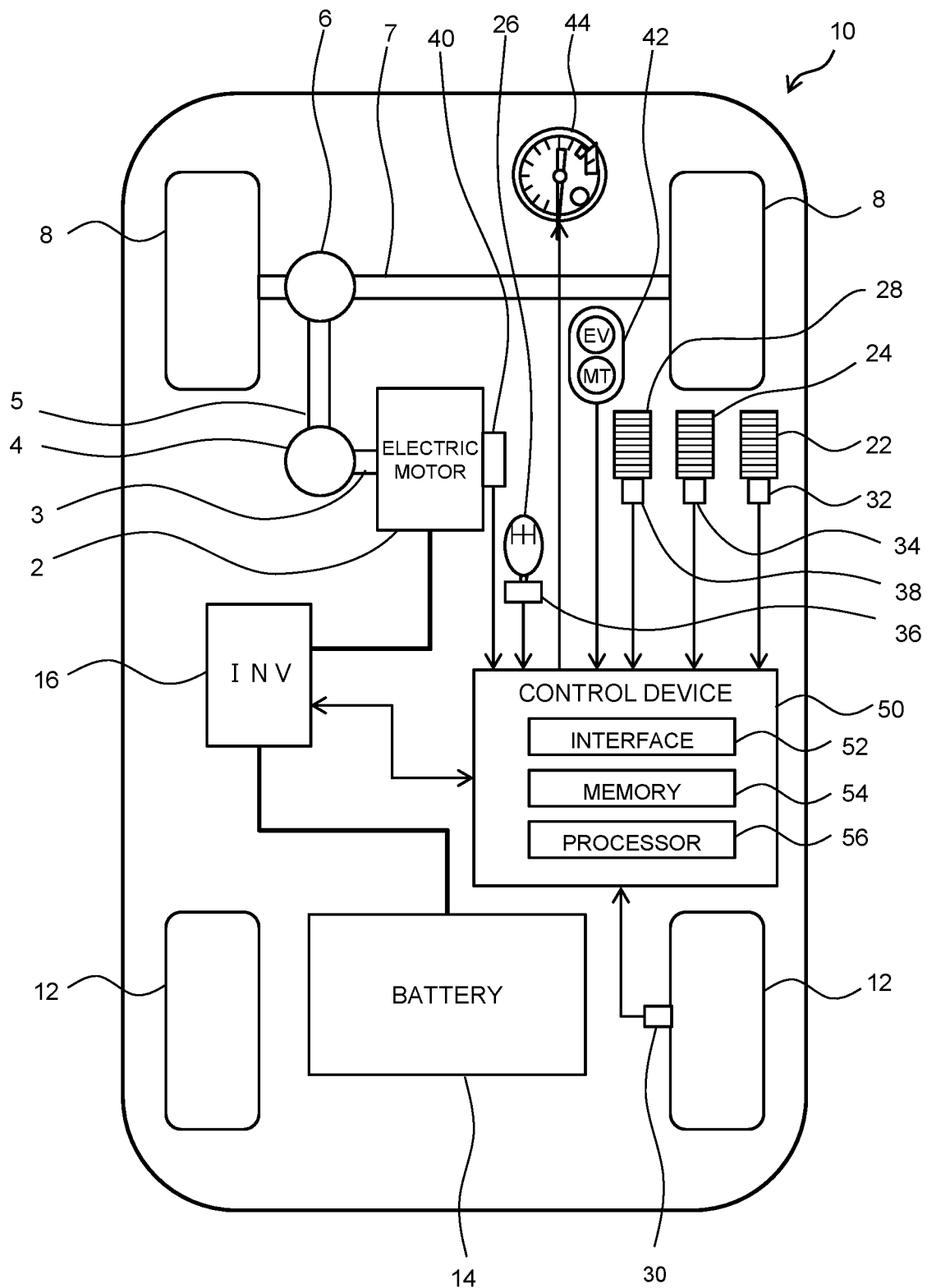

FIG. 1 is a diagram schematically illustrating a configuration of a powertrain system of an electric vehicle 10 according to the present embodiment. As shown in FIG. 1, the electric vehicle 10 includes an electric motor 2 as an engine. The electric motor 2 is, for example, a brushless DC motor or a three-phase alternating current synchronous motor. The electric motor 2 is provided with a rotational speed sensor 40 for detecting a rotational speed of the electric motor 2. An output shaft 3 of the electric motor 2 is connected to one end of a propeller shaft 5 via a gear mechanism 4. The other end of the propeller shaft 5 is connected to a drive shaft 7 in a vehicle front via a differential gear 6.

The electric vehicle 10 includes drive wheels 8 that are front wheels, and driven wheels 12 that are rear wheels. Each of the drive wheels 8 is provided at both ends of the drive shaft 7. Each of the wheels 8 and 12 is provided with a wheel speed sensor 30. In FIG. 1, only the wheel speed sensor 30 of a right rear wheel is typically depicted. The wheel speed sensor 30 is also used as a vehicle speed sensor for detecting a vehicle speed of the electric vehicle 10. The wheel speed sensor 30 is connected to a control device 50 described later by an in-vehicle network such as a CAN (Controller Area Network).

The electric vehicle 10 includes a battery 14, and an inverter 16. The battery 14 stores electric energy that drives the electric motor 2. The inverter 16 converts a direct current power that is inputted from the battery 14 into a drive electric power for the electric motor 2. Power conversion by the inverter 16 is performed by PWM (Pulse Wave Modulation) control by the control device 50. The inverter 16 is connected to the control device 50 by the in-vehicle network.

The electric vehicle 10 includes input devices by which the driver input an operation request to the electric vehicle 10. Especially, the electric vehicle 10 includes an accelerator pedal (accelerating pedal) 22 for inputting an acceleration request, and a brake pedal (braking pedal) 24 for inputting a braking request. The accelerator pedal 22 is provided with an accelerator position sensor 32 for detecting an accelerator opening Pap[%] that is an operation amount of the accelerator pedal 22. The brake pedal 24 is provided with a brake position sensor 34 for detecting a brake pedal depression amount Pb[%] that is an operation amount of the brake pedal 24. The accelerator position sensor 32 and the brake position sensor 34 are connected to the control device 50 by the in-vehicle network.

The electric vehicle 10 further includes a pseudo shift lever (pseudo shift device) 26 and a pseudo clutch pedal 28. A shift lever (shift device) and a clutch pedal are devices that operate a manual transmission (MT), but as a matter of course, the electric vehicle 10 does not include an MT. The pseudo shift lever 26 and the pseudo clutch pedal 28 are just dummies different from the ordinary shift lever and clutch pedal.

The pseudo shift lever 26 has a structure simulating a shift lever normally included in an MT vehicle. The pseudo shift lever 26 is provided to have placement and operation feeling equivalent to a real MT vehicle. The pseudo shift lever 26 is provided with positions corresponding to respective gear stages of, for example, a first speed, second speed, third speed, fourth speed, fifth speed, sixth speed, reverse and neutral. The pseudo shift lever 26 is provided with a shift position sensor 36 that detects a shift position Sp showing which position the pseudo shift lever 26 is set to. The respective shift positions Sp correspond to gear stages of an MT vehicle model (described later) in one to one correspondence, and by change of the shift position Sp, motor torque changes according to a gear state corresponding to the shift position Sp. For example, when the shift position Sp shows a position of neutral (neutral position), a torque characteristic is simulated by the MT vehicle model to be a neutral state of a real MT vehicle where a clutch is not connected to a manual transmission. The shift position sensor 36 is connected to the control device 50 by the in-vehicle network.

The pseudo clutch pedal 28 has a structure that simulates a clutch pedal normally included in an MT vehicle. The pseudo clutch pedal 28 is provided to have placement and operation feeling equivalent to a real MT vehicle. The driver depresses the pseudo clutch pedal 28 when the driver tries to change setting of a gear stage by the pseudo shift lever 26, and when the change of setting of the gear stage is finished, the driver stops depression and returns the pseudo clutch pedal 28 to neutral. The pseudo clutch pedal 28 is provided with a clutch position sensor 38 for detecting a clutch pedal depression amount Pc [%] that is an operation amount of the pseudo clutch pedal 28. The clutch position sensor 38 is connected to the control device 50 by the in-vehicle network.

The electric vehicle 10 includes a pseudo engine speed meter 44. An engine speed meter is a device that displays a speed of an internal combustion engine to a driver, but as a matter of course, the electric vehicle 10 does not include an internal combustion engine. The pseudo engine speed meter 44 is just a dummy different from an ordinary engine speed meter. The pseudo engine speed meter 44 has a structure that simulates an engine speed meter included in a conventional vehicle. The pseudo engine speed meter 44 may be of a mechanical type, or a liquid crystal display type. Alternatively, the pseudo engine speed meter 44 may be of a projection display type by a head-up display. In the case of a liquid crystal display type and a projection display type, a revolution limit may be enabled to be set arbitrarily. The pseudo engine speed meter 44 is connected to the control device 50 by the in-vehicle network.

The electric vehicle 10 includes a mode changeover switch (mode changeover device) 42. The mode changeover switch 42 is a switch that switches a running mode of the electric vehicle 10. The running mode include an MT mode and an EV mode. The mode changeover switch 42 is configured to be able to select either one of the MT mode and the EV mode manually. Though details will be described later, when the MT mode is selected, control of the electric motor 2 is performed in a control mode (first mode) for driving the electric vehicle 10 like the MT vehicle. When the EV mode is selected, control of the electric motor 2 is performed in a normal control mode (second mode) for an ordinary electric vehicle. Note that the mode changeover switch 42 is a device by which the driver select the running mode manually, but switching to the EV mode may be automatically performed. In this case, the mode changeover switch 42 may be configured to be able to select only the MT mode. When switching to the EV mode is automatically performed, the switching is configured to be performed based on vehicle peripheral information acquired by external sensors such as a camera and LIDAR (Light Detection And Ranging), and positional information on a map that can be acquired by a navigation device, for example. The mode changeover switch 42 is connected to the control device 50 by the in-vehicle network.

The electric vehicle 10 includes the control device 50. The control device 50 is a device that controls motor torque outputted by the electric motor 2 via the inverter 16. Further, the control device 50 calculates an engine speed (virtual engine speed) in a virtual engine that simulates the MT vehicle, and outputs a signal to causes the pseudo engine speed meter 44 to display information. The control device 50 is typically an ECU (Electronic Control Unit) that is loaded on the electric vehicle 10. The control device 50 may be a combination of a plurality of ECUs. Alternatively, the control device 50 may be an information processing device outside of the electric vehicle 10. The control device 50 includes an interface 52, a memory 54, and a processor 56. The interface 52 is connected to the in-vehicle network. The memory 54 includes a RAM (Random Access Memory) that stores data temporarily, and a ROM (Read Only Memory) that stores a control program executable by the processor 56 and various data relating to the control program. The processor 56 reads the control program and data from the memory 54 and executes the control program, and generates a control signal based on information acquired from each of the sensors.

The electric vehicle 10 according to the present embodiment may be configured to be able to perform autonomous driving control that automatically controls driving of the vehicle. The autonomous driving control is executed by an autonomous driving control device 70 that is not illustrated in FIG. 1. The autonomous driving control sets a running plan to a destination, and performs vehicle control so that the vehicle automatically runs along a target running route generated based on the running plan. The vehicle control includes acceleration control, braking control, and steering control. The vehicle control is performed by acquiring driving environment information of an own vehicle, generating control signals for autonomous driving to each of ECUs that manage acceleration, braking, and steering based on the driving environment information and outputting the control signals to each of the ECUs.

Figure 2:
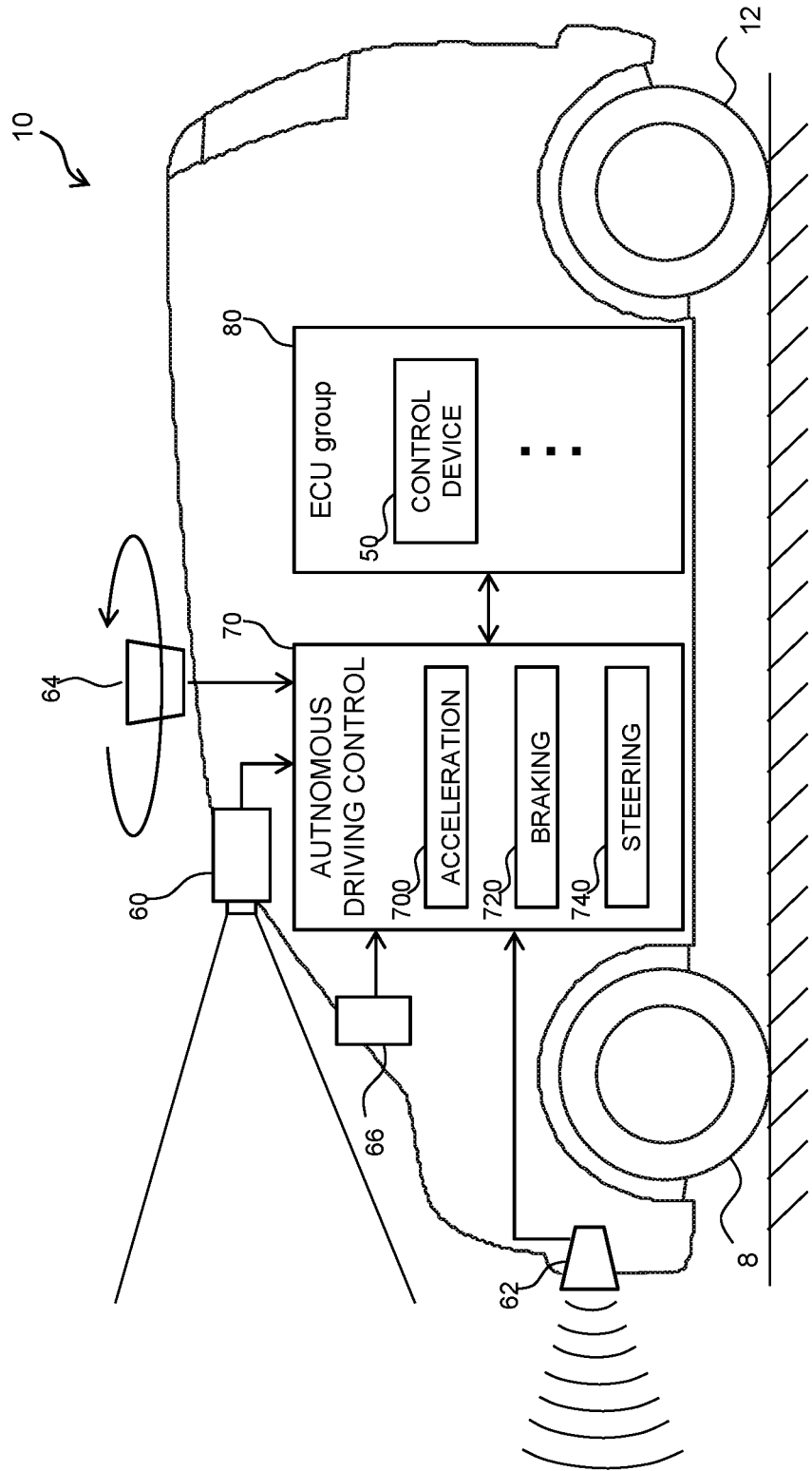

FIG. 2 is a diagram illustrating a configuration example of an autonomous driving control system in a case where the electric vehicle 10 according to the present embodiment performs autonomous driving control. The electric vehicle 10 includes a camera 60, a radar 62, and a LIDAR 64 as external sensors for detecting the driving environment information around the own vehicle. The camera 60 and the radar 62 are attached to be able to detect at least object information in front of the own vehicle, road information, and traffic information. The LIDAR 64 is, for example, attached to a roof of the vehicle and detects the driving environment information around the own vehicle. Further, the electric vehicle 10 includes a navigation device 66 that estimates a current position of the own vehicle on a map based on map information and GPS information. The external sensors 60, 62 and 64 and the navigation device 66 are connected to the autonomous driving control device 70 by the in-vehicle network.

When performing the autonomous driving control, the electric vehicle 10 includes the autonomous driving control device 70. The autonomous driving control device 70 is one of ECUs, and a configuration thereof is equal to the configuration of the control device 50. In other words, the autonomous driving control device 70 includes an interface, a memory, and a processor. The interface is connected to the in-vehicle network. The memory includes a RAM and a ROM. The processor reads a control program and data from the memory, and generates an control signal for autonomous driving based on the acquired information.

The autonomous driving control device 70, via the in-vehicle network, acquires the driving environment information of the own vehicle from each of the sensors and each of the ECUs included in the own vehicle. Here, the respective sensors also include sensors that are connected to the in-vehicle network, and detect operation amounts for driving of the own vehicle (for example, the accelerator position sensor 32 and the brake position sensor 34, not shown in FIG. 2). The information acquired from the respective ECUs is information on control amounts calculated by the respective ECUs and the like.

The autonomous driving control device 70 executes an acceleration control amount calculation process 700, a braking control amount calculation process 720, and a steering control amount calculation process 740 based on the driving environment information that is acquired as described above. In more detail, programs stored in the memory of the autonomous driving control device 70 are read by the processor of the autonomous driving control device 70, then the processor executes these processes.

The autonomous driving control device 70 generates control signals for autonomous driving that give control amounts obtained by executing the acceleration control amount calculation process 700, the braking control amount calculation process 720, and the steering control amount calculation process 740, and outputs the control signals to an ECU group 80 including the respective ECUs that manage acceleration, braking and steering.

The ECU group 80 is connected to the autonomous driving control device 70 via the in-vehicle network. The ECU group 80 acquires control signals from the autonomous driving control device 70, and executes vehicle control (acceleration control, braking control, and steering control) by controlling actuators connected to the respective ECUs according to the control signals.

The ECU group 80 includes the control device 50. The control device 50 acquires the control signal from the autonomous driving control device 70, and executes control of motor torque outputted by the electric motor 2 according to the control signal. In other words, the control device 50 is one of ECUs that manage acceleration. Further, when performing a regeneration brake using regeneration of the electric motor 2, the control device 50 also functions as an ECU that manages braking.

Examples of other ECUs included in the ECU group 80 are as follows. As an example of the ECU that manages braking, a brake control ECU is cited, which executes processes concerning an ABS (Antilock Brake System) and EBD (Electronic Brake force Distribution). As an ECU that manages steering, a steering control ECU is cited, which executes processes concerning a power steering system and a steer by wire steering system.

Note that the aforementioned running modes (the MT mode and the EV mode) function when autonomous driving control is not under execution (that is, during manual driving by the driver). During execution of the autonomous driving control, control of the electric motor 2 is performed according to a request value of motor torque outputted from the autonomous driving control device 70 as described above. In this case, calculation of the request value of the motor torque is performed based on a torque characteristic by ordinary motor torque control of the electric motor 2. In other words, sense to driving during execution of the autonomous driving control is equivalent to sense to driving of the ordinary electric vehicle.

Switching from manual driving to autonomous driving control is configured to be able to be performed intentionally by the driver. For example, the electric vehicle 10 is equipped with a physical or electronic switch (not shown in FIG. 1), and switching from manual driving to the autonomous driving control is configured to be performed by pressing down the switch by the driver. Alternatively, such a switch may be configured to be included in the mode changeover switch 42.

Switching from the autonomous driving control to the manual driving is configured to be performed automatically, or intentionally by the driver. A case where switching to the manual driving is intentionally performed by the driver is, for example, a case where the switching is performed by the physical or electronic switch included in the electric vehicle 10 similarly described above. A case where switching to the manual driving is performed automatically is a case where the autonomous driving control device 70 determines that it cannot keep the autonomous driving control based on the driving environment information. This is, for example, a case where some of the sensors that acquire the driving environment information fail, a case where the electric vehicle 10 runs in an area where the autonomous driving control is prohibited from being performed, and the like. When switching to the manual driving is automatically performed, from the viewpoint of safety, the driver is generally notified of the switching to the manual driving in advance by sound and display.

Figure 3:
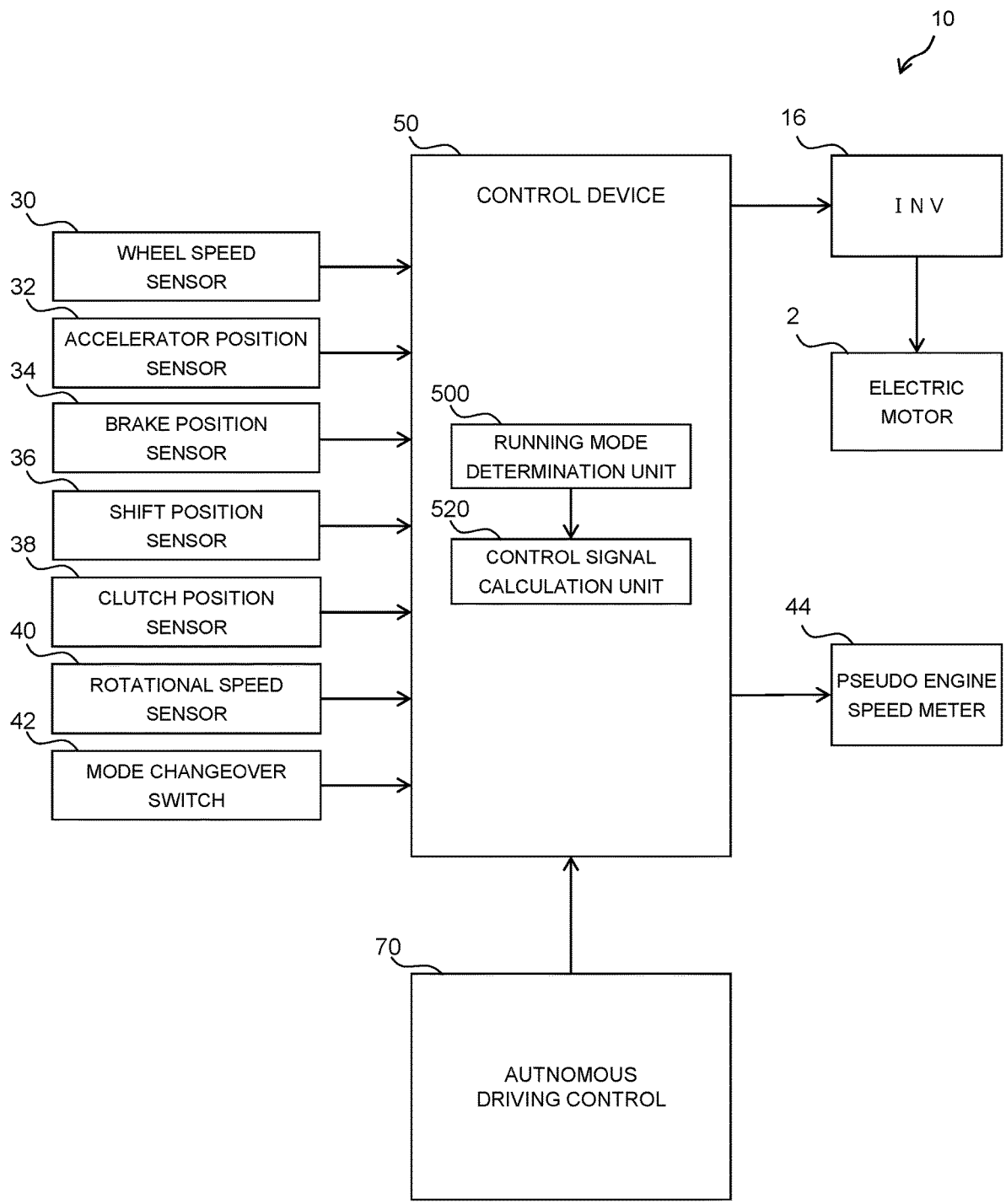
FIG. 3 is a block diagram illustrating a configuration of a control system of the electric vehicle according to the present embodiment.

FIG. 3 is a block diagram illustrating a configuration of a control system of the electric vehicle 10 according to the present embodiment. Signals from the wheel speed sensors 30, the accelerator position sensor 32, the brake position sensor 34, the shift position sensor 36, the clutch position sensor 38, the rotational speed sensor 40, and the mode changeover switch 42 are inputted to the control device 50. Further, when autonomous driving control is performed, a signal is inputted from the autonomous driving control device 70. The communication between these devices and the control device 50 is performed via the in-vehicle network. Though not shown in FIG. 3, various devices may be loaded on the electric vehicle 10 besides these devices, and are connected to the control device 50 by the in-vehicle network.

Further, from the control device 50, signals are outputted to at least the inverter 16 and the pseudo engine speed meter 44. The communication between these devices and the control device 50 is performed via the in-vehicle network. Though not shown in FIG. 3, various actuators and displays that are controlled by the control device 50 may be loaded on the electric vehicle 10 besides these devices, and are connected to the control device 50 by the in-vehicle network.

The control device 50 includes a running mode determination unit 500, and a control signal calculation unit 520. In detail, the program stored in the memory 54 is read and executed by the processor 56, and thereby the processor 56 functions as at least the running mode determination unit 500, and the control signal calculation unit 520. In the running mode determination unit 500, the running mode of the electric vehicle 10 is determined to whether the MT mode or the EV mode. In the control signal calculation unit 520, control signals to the actuators and other devices that are controlled by the control device 50 are calculated. The control signals include at least a signal for controlling motor torque outputted by the electric motor 2 via the inverter 16, and a signal for causing the pseudo engine speed meter 44 to display information. Hereinafter, these functions of the control device 50 will be described.

2. FUNCTIONS OF CONTROL DEVICE 2-1. Motor Torque Calculation Function

Figure 4:
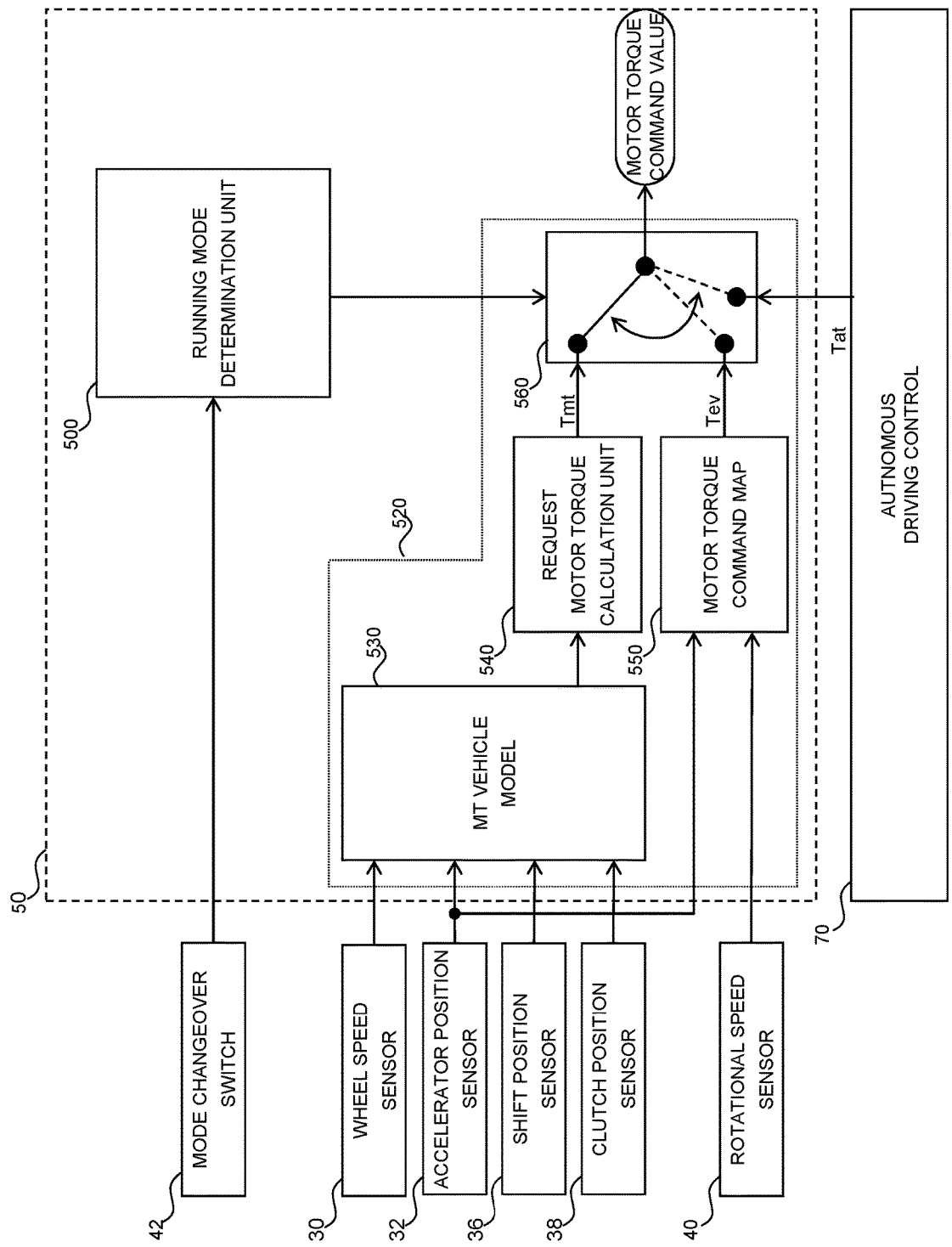
FIG. 4 is a block diagram illustrating a function of the control device according to the present embodiment.

FIG. 4 is a block diagram illustrating a function of the control device 50 according to the present embodiment, in particular, the function relating to calculation of a motor torque command value to the electric motor 2. The control device 50 calculates the motor torque command value by the function illustrated in the block diagram, and generates a control signal to perform torque control of the electric motor 2 via the inverter 16 based on the motor torque command value.

As illustrated in FIG. 4, the control signal calculation unit 520 includes an MT vehicle model 530, a request motor torque calculation unit 540, a motor torque command map 550, and a changeover switch 560. Signals from the wheel speed sensors 30, the accelerator position sensor 32, the shift position sensor 36, the clutch position sensor 38, and the rotational speed sensor 40 are inputted to the control signal calculation unit 520. The control signal calculation unit 520 processes the signals from these sensors, and calculates the motor torque that the electric motor 2 should output.

There are two calculations of motor torque by the control signal calculation unit 502, a calculation using the MT vehicle model 530 and the request motor torque calculation unit 540, and a calculation using the motor torque command map 550. The former calculation is used to calculate the motor torque in a case of causing the electric vehicle 10 to run in the MT mode. The latter calculation is used to calculate the motor torque in a case of causing the electric vehicle 10 to run in the EV mode. Which motor torque is the motor torque command value is selected by switching of the changeover switch 560. Switching of the changeover switch 560 is performed based on a determination result by the running mode determination unit 500. However, during execution of the autonomous driving control, these motor torques are not used, and a motor torque that is outputted from the autonomous driving control device 70 is used. In this case, determination of switching is performed by the changeover switch 560.

2-2. Calculation of Motor Torque in MT Mode

Drive wheel torque in the MT vehicle is determined by an operation of a gas pedal that controls fuel supply to the engine, an operation of the shift lever (shift device) that switches the gear stage of the MT, and an operation of the clutch pedal that operates the clutch between the engine and the MT. In the MT vehicle model 530, the drive wheel torque is calculated according to the accelerator pedal 22, the pseudo clutch pedal 28, and the pseudo shift lever 26. Hereinafter, in the MT mode, an engine, a clutch and an MT that are virtually realized by the MT vehicle model 530 will be referred to as a virtual engine, a virtual clutch, and a virtual MT.

To the MT vehicle model 530, as simulating an operation amount of a gas pedal for the virtual engine, a signal from the accelerator position sensor 32 is inputted. As a shift position of a shift lever for the virtual MT, a signal from the shift position sensor 36 is inputted. As an operation amount of a clutch pedal for the virtual clutch, a signal from the clutch position sensor 38 is inputted. And, as signals indicating a load state of the vehicle, signals from wheel speed sensors 30 are inputted. The MT vehicle model 530 is a model that simulates a torque characteristic of the drive wheel torque in the MT vehicle. The MT vehicle model 530 is given so that operations of the accelerator pedal 22, the pseudo shift lever 26, and the pseudo clutch pedal 28 are reflected in a value of the drive wheel torque. Details of the MT vehicle model 530 will be described later.

The request motor torque calculation unit 540 converts the drive torque calculated in the MT vehicle model 530 into request motor torque. The request motor torque is motor torque that is required to realize the drive torque calculated in the MT vehicle model 530. To convert the drive torque into the request motor torque, a speed reduction ratio from the output shaft 3 of the electric motor 2 to the drive wheel 8 is considered.

2-3. Calculation of Motor Torque in EV Mode

Figure 5:
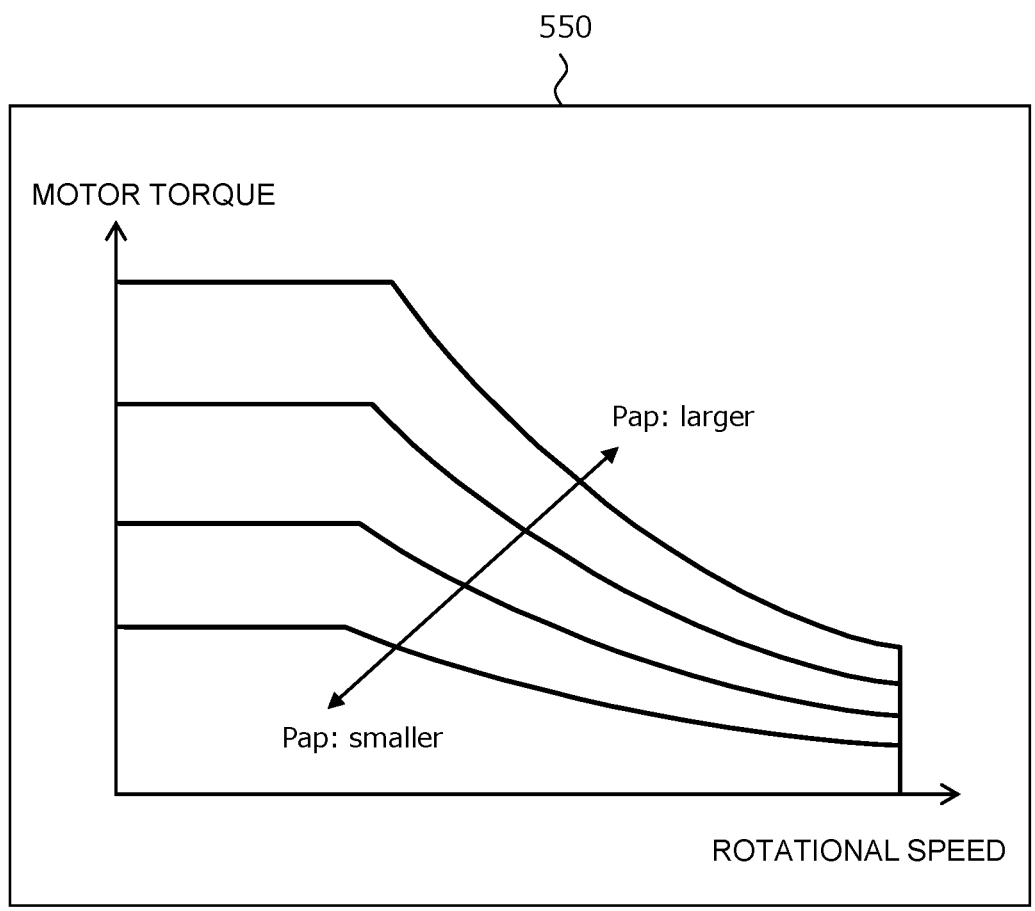
FIG. 5 is a diagram illustrating one example of the motor torque command map.

FIG. 5 is a diagram illustrating one example of the motor torque command map 550 that is used in calculation of the motor torque in the EV mode. The motor torque command map 550 is a map for determining motor torque corresponding to the accelerator opening Pap and the rotational speed of the electric motor 2. To the motor torque command map 50, the signal from the accelerator position sensor 32 and the signal of the rotational speed sensor 40 are inputted as parameters. The motor torque command map 550 outputs motor torque which is determined corresponding to these signals.

2-4. Switching of Motor Torque

The motor torque calculated by the motor torque command map 550 is described as Tev, and the motor torque calculated by the MT vehicle model 530 and the request motor torque calculation unit 540 is described as Tmt. And, the motor torque outputted from the autonomous driving control device 70 is described as Tat. Of these motor torques Tev, Tmt and Tat, the motor torque selected by switching of the changeover switch 560 is given to the electric motor 2 as the motor torque command value.

During the manual driving, the first mode corresponds to a case where the motor torque Tev is selected by the changeover switch 560, and the second mode corresponds to a case where the motor torque Tmt is selected by the changeover switch 560.

In the EV mode, even when the driver operates the pseudo shift lever 26 and the pseudo clutch pedal 28, the operations are not reflected in driving of the electric vehicle 10. In other words, in the EV mode, the operation of the pseudo shift lever 26 and the operation of the pseudo clutch pedal 28 are disabled. However, even while the motor torque Tev is given as the motor torque command value, calculation of the motor torque Tmt by the MT vehicle model 530 is continued. On the other hand, even while the motor torque Tmt is given as the motor torque command value, calculation of the motor torque Tev is also continued. Likewise, even while autonomous driving control is under execution and the motor torque Tat is given as the motor torque command value, calculation of the motor torque Tmt and calculation of the motor torque Tev are continued. In other words, both the motor torque Tev and the motor torque Tmt are continuously inputted to the changeover switch 560.

By the changeover switch 560, the motor torque command value is switched as follows. From the motor torque Tev to the motor torque Tmt or Tat, or from the motor torque Tmt to the motor torque Tev or Tat, or from the motor torque Tat to the motor torque Tmt or Tev. When there is a deviation between the motor torque before switching and the motor torque after switching, a torque difference occurs following the switching. Therefore, for a while after the switching, a slow change process is executed for the motor torque command value to suppress an abrupt change in torque. For example, when the running mode is switched to the MT mode from the EV mode during manual driving, the motor torque command value is gradually changed toward the motor torque Tmt at a predetermined change rate, not being switched to the motor torque Tmt immediately. A similar process is also performed when the running mode is switched to the EV mode from the MT mode.

Switching of the changeover switch 560 is performed based on the signals from the running mode determination unit 500 and the autonomous driving control device 70. A signal from the mode changeover switch 42 is inputted to the running mode determination unit 500. The running mode determination unit 500 determines the running mode to be notified to the changeover switch 560 based on the running mode selected in the mode changeover switch 42. Here, considering the case where switching to the EV mode is automatically performed as described above, the running mode determination unit 500 may be configured to determine that the running mode is the EV mode based on the driving environment information. In this case, the running mode determination unit 500 may be configured to receive signals from the external sensors 60, 62 and 64 and the navigation device 66, and the other sensors (such as the wheel speed sensors 30, the accelerator position sensor 32, and the brake position sensor 34).

Determination that the running mode is the MT mode is performed when the mode changeover switch 42 is operated by the driver and the MT mode is selected. Here, even when the mode changeover switch 42 is operated by the driver and the MT mode is selected, the running mode determination unit 500 may be configured not to determine that the running mode is the MT mode based on the environment information acquired from the sensors. Determination that the running mode is the EV mode is performed when the mode changeover switch 42 is operated by the driver and the EV mode is selected. Alternatively, as described above, determination that the running mode is the EV mode is performed based on the environment information acquired from the sensor.

In the manual driving, the changeover switch 560 outputs the motor torque command value according to the running mode that is notified by the running mode determination unit 500. In other words, when being notified of determination that the running mode is the MT mode, the changeover switch 560 outputs the motor torque Tmt as the motor torque command value, and when being notified of determination that the running mode is the EV mode, the changeover switch 560 outputs the motor torque Tev as the motor torque command value.

In the case under autonomous driving control, the changeover switch 560 outputs the motor torque Tat as the motor torque command value. Determination of whether or not it is under the autonomous driving control is performed based on a signal outputted from the autonomous driving control device 70. For example, when the motor torque Tat is larger than zero, it is determined to be under the autonomous driving control. Alternatively, the autonomous driving control device 70 outputs a signal that shows whether or not it is under the autonomous driving control, and the determination may be performed based on this signal.

2-5. MT Vehicle Model 2-5-1. Outline

Figure 6:
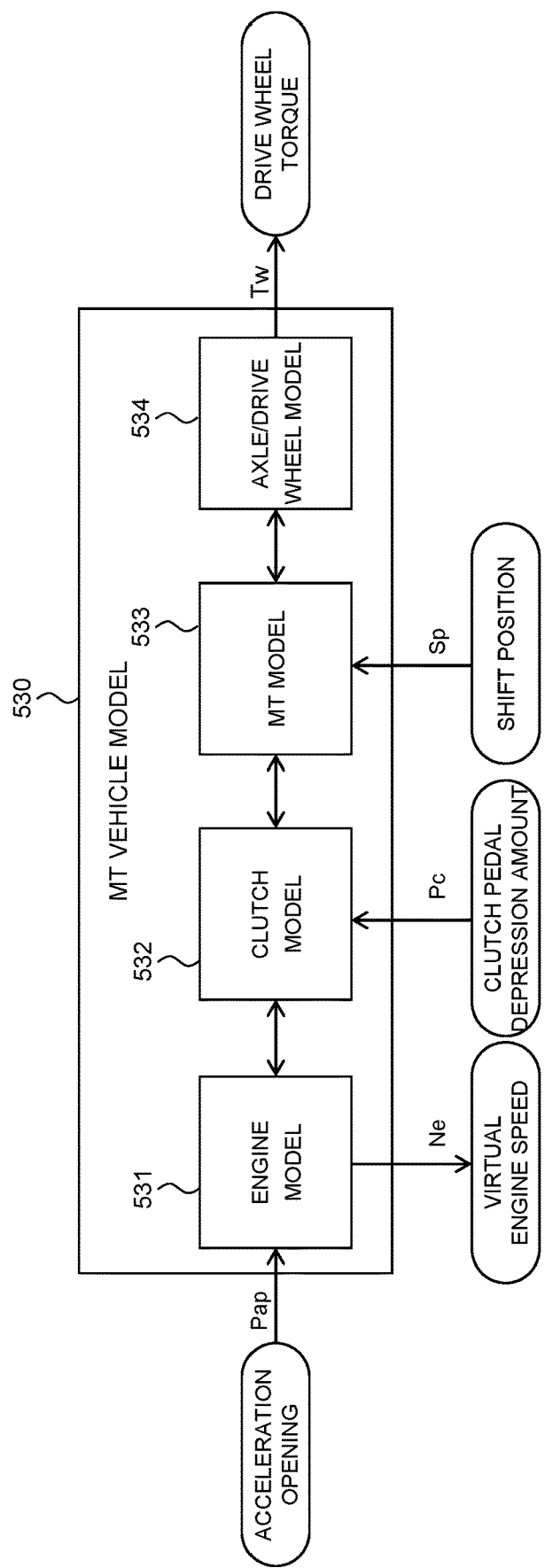
FIG. 6 is a block diagram illustrating one example of the MT vehicle model.

Next, the MT vehicle model 530 will be described. FIG. 6 is a block diagram illustrating one example of the MT vehicle model 530. The MT vehicle model 530 is configured by an engine model 531, a clutch model 532, an MT model 533, and an axle/drive wheel model 534. In the engine model 531, a virtual engine is modeled. In the clutch model 532, a virtual clutch is modeled. In the MT model 533, a virtual MT is modeled. In the axle/drive wheel model 534, a virtual torque transmission system from the axle to the drive wheels is modeled. Each of the models may be expressed by a formula or may be expressed by a map.

Calculation results in the respective models are mutually transmitted among the models. The acceleration opening Pap detected by the accelerator position sensor 32 is inputted to the engine model 531. The clutch pedal depression amount Pc detected by the clutch position sensor 38 is inputted to the clutch model 532. The shift position Sp detected by the shift position sensor is inputted to the MT model 533. Further, in the MT vehicle model 530, the vehicle speed Vw (or wheel speed) detected by the wheel speed sensor 30 is used in the plurality of models. In the MT vehicle model 530, the drive wheel torque Tw and a virtual engine speed Ne are calculated based on these input signals.

2-5-2. Engine Model

The engine model 531 calculates the virtual engine speed Ne and a virtual engine output torque Teout. The engine model 531 is configured by a model that calculates the virtual engine speed Ne and a model that calculates the virtual engine output torque Teout. In calculation of the virtual engine speed Ne, a model expressed by expression (1) below is used, for example. In expression (1) below, the virtual engine speed Ne is calculated from a rotational speed Nw of the wheel 8, a total reduction ratio R, and a slip rate of the clutch mechanism SLIP.

[Math. 1]

$$Ne = Nw \times R \times \frac{1}{1-SLIP} \quad (1)$$

In expression (1), the rotational speed Nw of the wheel 8 is calculated from the wheel speed detected by the wheel speed sensor 30. The total reduction ratio R is calculated from a gear ratio (transmission gear ratio) r calculated by the MT model 533 described later, and a reduction ratio specified by the axle/drive wheel model 534. The slip rate SLIP is calculated by the clutch model 532 described later. The virtual engine speed Ne is displayed on the pseudo engine speed meter 44 when the MT mode is selected.

However, expression (1) is a calculation formula of the virtual engine speed Ne when the virtual engine and the virtual MT are connected by the virtual clutch. When the virtual clutch is disconnected, the virtual engine torque Te generated in the virtual engine is torque obtained by adding torque as for moment of inertia to the virtual engine output torque Teout. When the virtual clutch is disconnected, the virtual engine output torque Teout is zero. Therefore, when the virtual clutch is disconnected, the engine model 531 calculates the virtual engine speed Ne by expression (2) below by using the virtual engine torque Te and a moment of inertia J of the virtual engine. In calculation of the virtual engine torque Te, a map having the the accelerator opening Pap as a parameter is used.

[Math. 2]

$$J \times \frac{30}{\pi} \times \frac{d}{dt} Ne = Te \quad (2)$$

Note that during idling of the MT vehicle, idle speed control (ISC control) that keeps the engine speed at a constant speed is performed. Therefore, when the virtual clutch is disconnected, the vehicle speed is zero, and the accelerator opening Pap is 0%, the engine model 531 calculates the virtual engine speed Ne as a predetermined idling speed (for example, 1000 rpm). When the driver depresses the accelerator pedal 22 in idling, the idling speed is used as an initial value of the virtual engine speed Ne calculated by expression (2).

Figure 7:
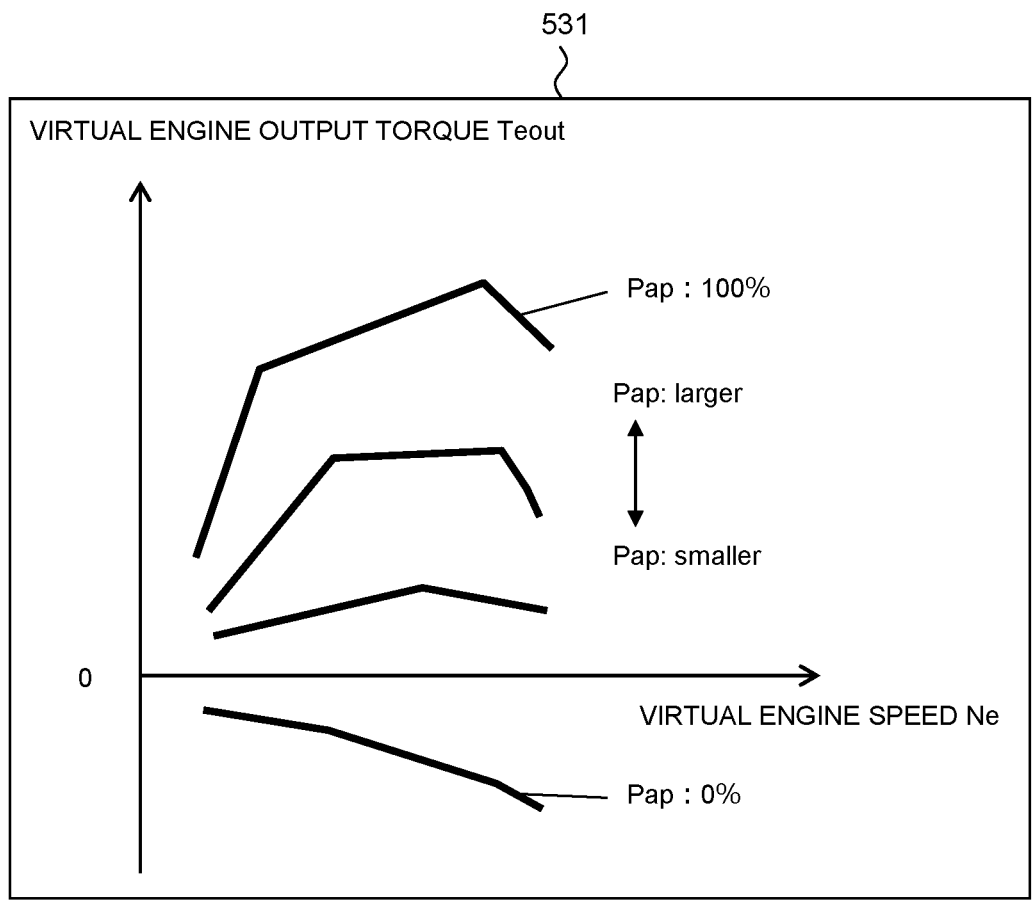
FIG. 7 is a diagram illustrating one example of the engine model.

The engine model 531 calculates a virtual engine output torque Teout from the virtual engine speed Ne and the accelerator opening Pap. In calculation of the virtual engine output torque Teout, for example, a two-dimensional map (as shown in FIG. 7) is used. In the two-dimensional map, the virtual engine output torque Teout is given corresponding to the virtual engine speed Ne for each accelerator opening Pap. A torque characteristic illustrated in FIG. 7 can be set to simulate a characteristic assuming a gasoline engine, or can be set to simulate a characteristic assuming a diesel engine. Further, the torque characteristic can be set to simulate a characteristic assuming a naturally aspirated engine, or can be set to simulate a characteristic assuming a supercharged engine. A switch for changing a type of the virtual engine in the MT mode may be provided so that the driver can switch the virtual engine to a desired setting. The virtual engine output torque Teout calculated by the engine model 531 is outputted to the clutch model 532.

2-5-3. Clutch Model

Figure 8:
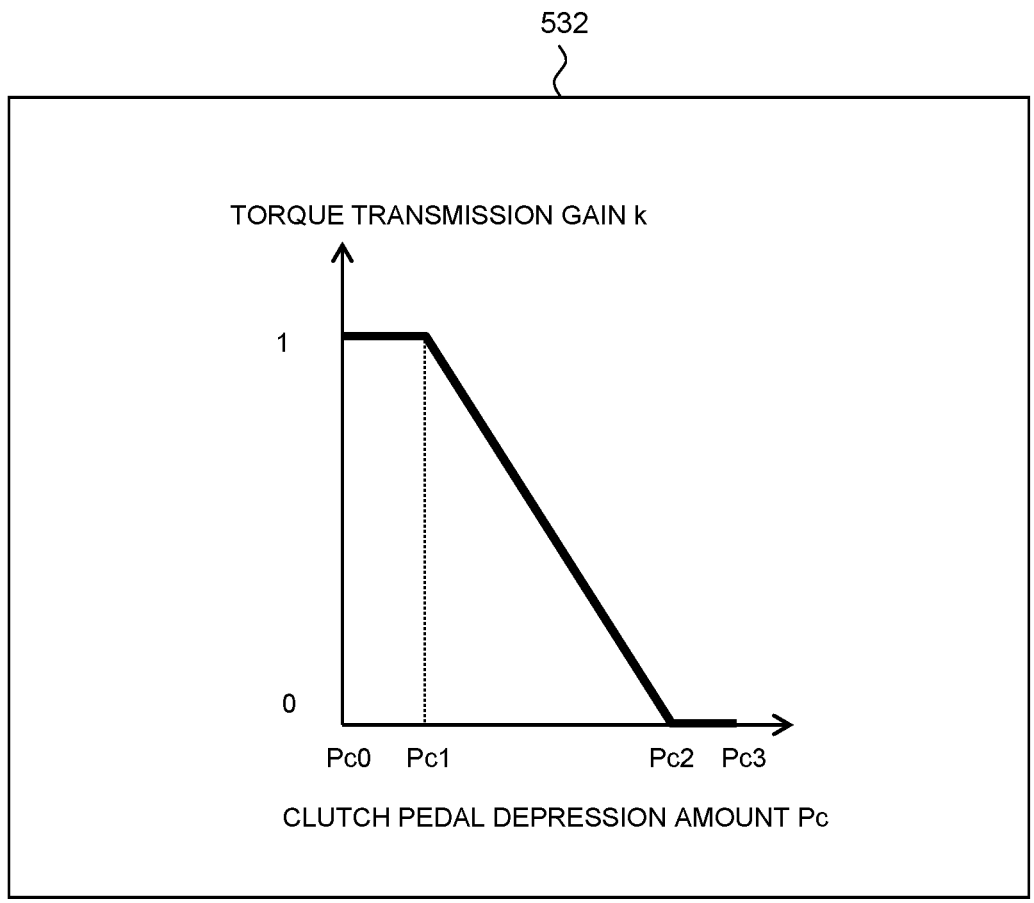
FIG. 8 is a diagram illustrating one example of the clutch model.

The clutch model 532 calculates a torque transmission gain k. The torque transmission gain k is a gain for calculating a torque transmission degree of the virtual clutch corresponding to the depression amount of the pseudo clutch pedal 28. The clutch model 532 has a map as shown in FIG. 8, for example. In the map, the torque transmission gain k is given corresponding to the clutch pedal depression amount Pc. In FIG. 8, the torque transmission gain k is given as follows. The torque transmission gain k is 1 in a range in which the clutch pedal depression amount Pc is Pc0 to Pc1, monotonously decreases to zero with a constant gradient in a range in which the clutch pedal depression amount Pc is Pc1 to Pc2, and zero in a range in which the clutch pedal depression amount Pc is Pc2 to Pc3. Here, Pc0 corresponds to the clutch pedal depression amount Pc of 0%, Pc1 corresponds to a limit of play when depressing the clutch pedal depression, Pc3 corresponds to the clutch pedal depression amount Pc of 100%, and Pc2 corresponds to a limit of play when returning the clutch pedal from Pc3.

The map shown in FIG. 8 is just an example, and as long as the change in the torque transmission gain k corresponding to an increase in the clutch pedal depression amount Pc is a monotonically non-increasing and decrease to 0, a change curve of the torque transmission gain k is not limited. For example, a change in the torque transmission gain k from Pc1 to Pc2 may be a monotonous decrease curve that is convex upward, or may be a monotonous decrease curve that is convex downward.

The clutch model 532 calculates a clutch output torque Tcout by the torque transmission gain k. The clutch output torque Tcout is torque outputted from the virtual clutch. The clutch model 532 calculates the clutch output torque Tcout from the virtual engine output torque Teout, and the torque transmission gain k by expression (3) below, for example. The clutch output torque Tcout calculated by the clutch model 532 is outputted to the MT model 533.

[Math. 3]

$$Tcout = Teout \times k \quad (3)$$

Further, the clutch model 532 calculates the slip rate SLIP. The slip rate SLIP is used in calculation of the virtual engine speed Ne in the engine model 531. In calculation of the slip rate SLIP, similarly to the torque transmission gain k, by expression (4) below that expresses a relationship of the slip rate SLIP and the torque transmission gain k to the clutch pedal depression amount Pc, the slip rate SLIP may be calculated from the torque transmission gain k.

[Math. 4]

$$SLIP = 1 - k \quad (4)$$

2-5-4. MT Model

Figure 9:
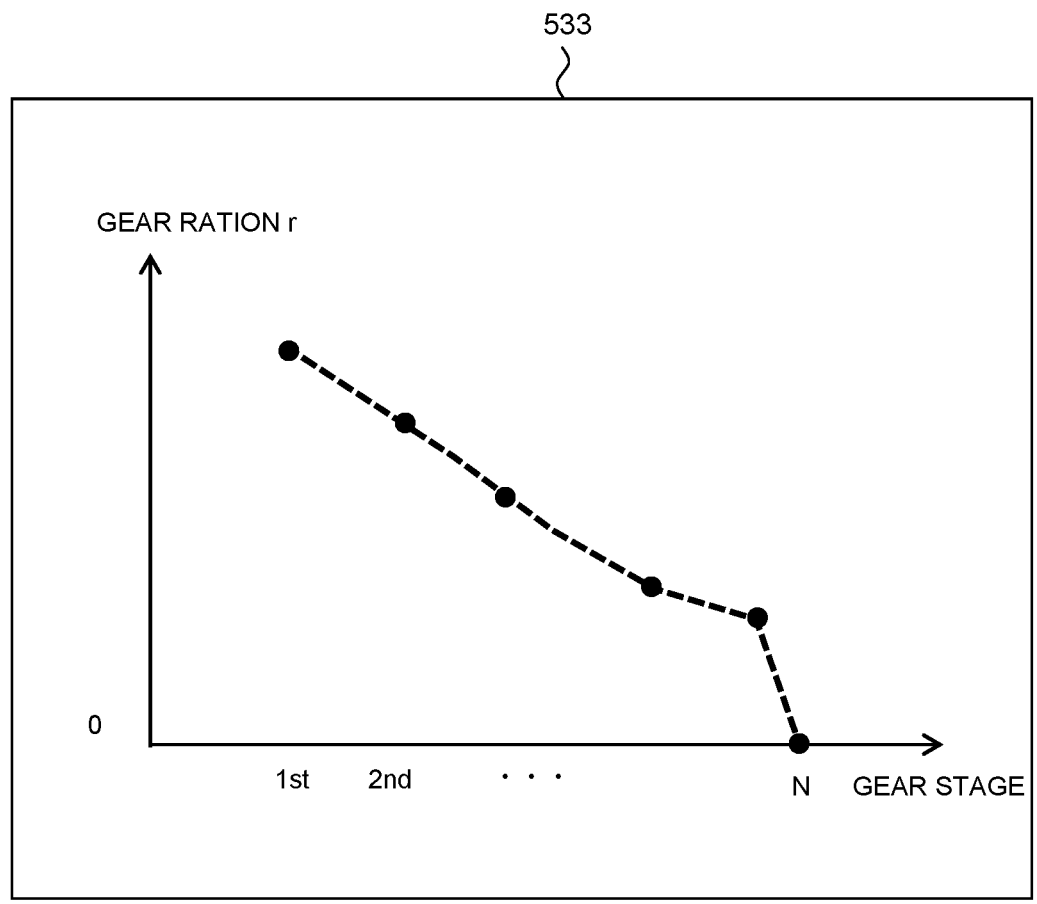
FIG. 9 is a diagram illustrating one example of the MT model.

The MT model 533 calculates the gear ratio (transmission gear ratio) r. The gear ratio r is a gear ratio that is determined by the shift position Sp of the pseudo shift lever 26 in the virtual MT. There is a one-to-one relationship between the shift position Sp of the pseudo shift lever 26 and the gear stage of the virtual MT. The MT model 533 has a map as shown in FIG. 9, for example. In the map, the gear ratio r is given corresponding to the gear stage. As shown in FIG. 9, as the gear stage is larger, the gear ratio r is smaller.

The MT model 533 calculates a transmission output torque Tgout by the gear ratio r. The transmission output torque Tgout is torque outputted from the virtual transmission. The MT model 533 calculates the transmission output torque Tgout from the clutch output torque Tcout and the gear ratio r by expression (5) below, for example. The transmission output torque Tgout calculated by the MT model 533 is outputted to the axle/drive wheel model 534.

[Math. 5]

$$Tgout = Tcout \times r \quad (5)$$

2-5-5. Axle/Drive Wheel Model

The axle/drive wheel model 534 calculates the drive wheel torque Tw by a predetermined reduction ratio rr. The reduction ratio rr is a fixed value determined by a mechanical structure from the virtual MT to the drive wheel 8. A value obtained by multiplying the gear ratio by the reduction ratio rr is the aforementioned total reduction ratio R. The axle/drive wheel model 534, for example, calculates the drive wheel torque Tw from the transmission output torque Tgout and the reduction ratio rr by expression (5) below. The drive wheel torque Tw calculated by the axle/drive wheel model 534 is outputted to the request motor torque calculation unit 540.

[Math. 6]

$$Tw = Tgout \times rr \quad (6)$$

2-6. Torque Characteristic of Electric Motor Realized by MT Mode

Figure 10:
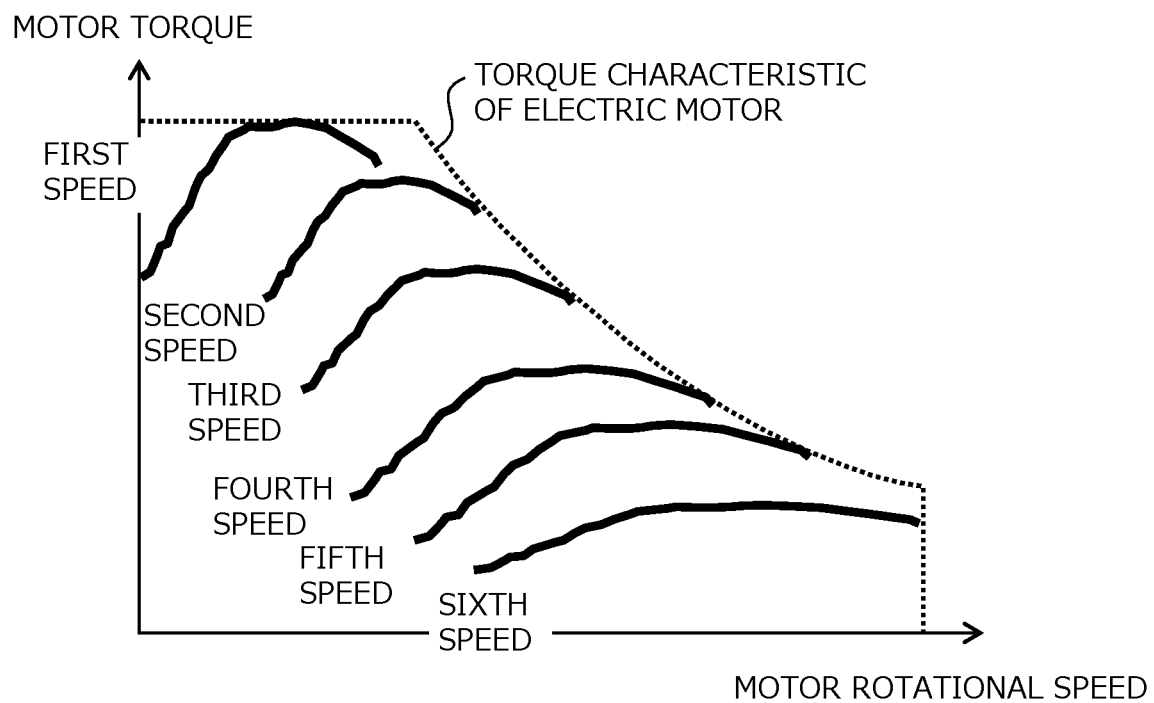
FIG. 10 is a diagram illustrating a torque characteristic of the electric motor realized in the MT mode.

The request motor torque calculation unit 540 converts the drive wheel torque Tw calculated by the MT vehicle model 530 into motor torque. FIG. 10 is a diagram illustrating a torque characteristic of the electric motor 2 realized in the MT mode. In detail, FIG. 10 is a diagram illustrating a characteristic of the motor torque to the motor rotational speed by being compared with a torque characteristic of the electric motor 2 realized in the EV mode. In the MT mode, as shown in FIG. 10, a torque characteristic that simulates the torque characteristic of the MT vehicle (solid lines in FIG. 10) can be realized corresponding to the gear stage set by the pseudo shift lever 26.

3. EFFECT

As described above, according to the electric vehicle 10 according to the present embodiment, the driver can drive the electric vehicle like the MT vehicle when the running mode is the MT mode. And, when the running mode is the EV mode, the driver can drive the electric vehicle with ordinary performance. Thereby, the driver can enjoy both driving like the MT vehicle and driving as the ordinary EV.

Further, the electric vehicle 10 according to the present embodiment includes the mode changeover switch 42 that allows the driver to select the MT mode by manual operation. Thereby, the driver can easily switch the running mode to the MT mode.

4. APPENDIX

The electric vehicle 10 according to the present embodiment is an FF vehicle that drives the front wheels with the single electric motor 2. However, the present invention is also applicable to an electric vehicle in which two electric motors are each positioned in a front and a rear, and drive each of the front wheels and rear wheels. Further, the present invention is also applicable to the electric vehicle including an in-wheel motor in each of wheels. As the MT vehicle model in each of these cases, a model of an all-wheel drive vehicle with MT can be used.

The electric vehicle 10 according to the present embodiment does not include a transmission. However, the present invention is also applicable to an electric vehicle including a stepped or continuously variable automatic transmission. In this case, a power train including an electric motor and an automatic transmission can be controlled so as to output the motor torque calculated in the MT vehicle model.

5. MODIFIED EXAMPLE OF ELECTRIC VEHICLE ACCORDING TO PRESENT EMBODIMENT

The electric vehicle 10 according to the present embodiment may be modified as follows.

In the running mode determination unit 500, when any one of the following conditions C1 to C4 is not satisfied, the processor 56 may be configured to reject that the MT mode is selected by the mode changeover switch 42. In other words, switching the control mode to the first mode is rejected.

C1: the own vehicle is in a stopped state.
C2: the brake pedal 24 is operated.
C3: the pseudo clutch pedal 28 is not operated.
C4: the shift position of the pseudo shift lever 26 is a neutral position.

Figure 11:
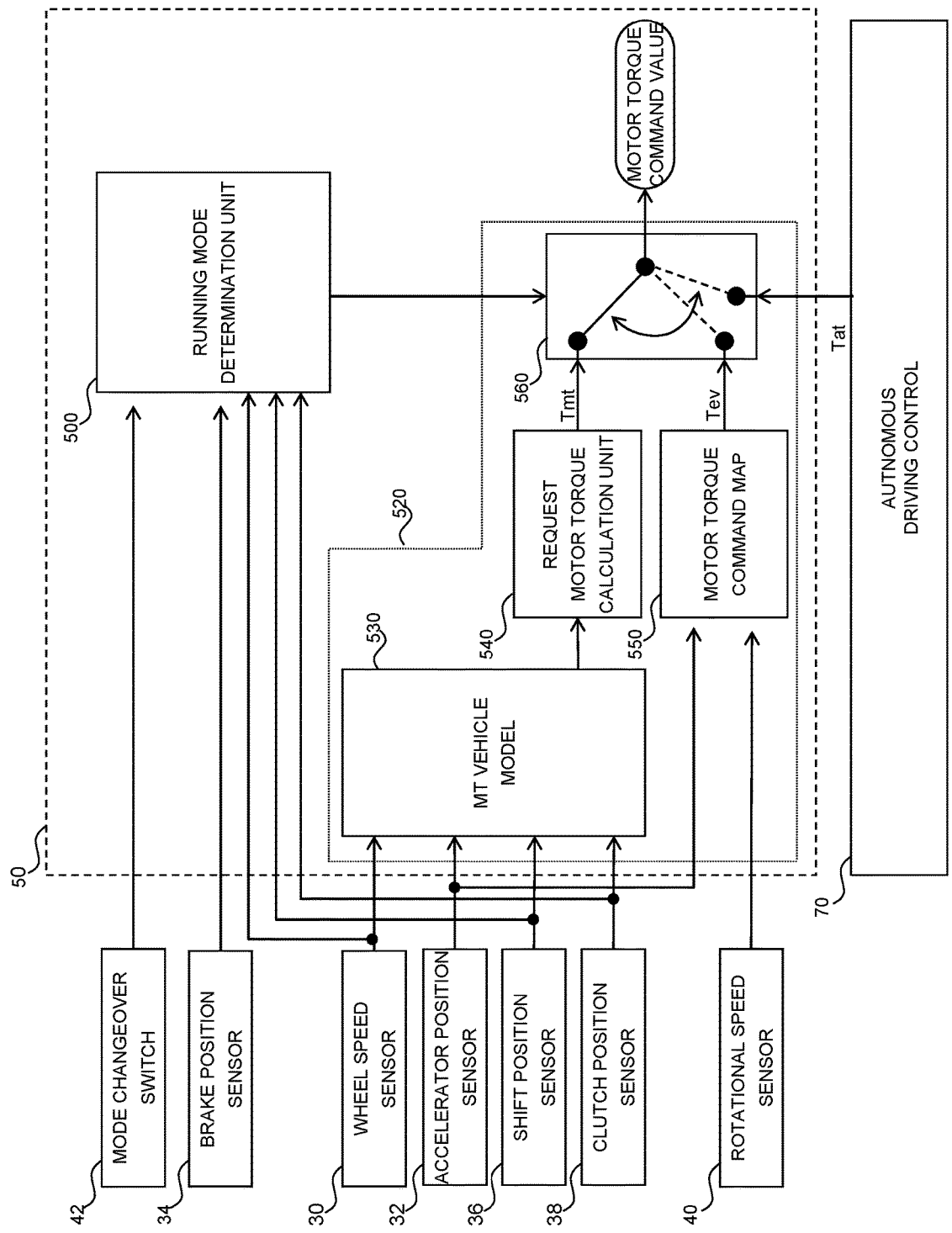
FIG. 11 is a block diagram illustrating functions of the electric vehicle according to the modified present embodiment.

In order that the processor 56 executes a determination process of determining whether or not these conditions C1 to C4 are satisfied in the running mode determination unit 500, the running mode determination unit 500 needs to acquire signals of the sensors. FIG. 11 is a block diagram illustrating functions of the electric vehicle 10 according to the modified present embodiment. As shown in FIG. 11, in the modified present embodiment, the signals are also inputted to the running mode determination unit 500 from the wheel speed sensors 30, the brake position sensor 34, the shift position sensor 36, and the clutch position sensor 38 in addition to the signal from the mode changeover switch 42. The vehicle speed of the own vehicle is acquired by the wheel speed sensor 30. The brake pedal depression amount Pb [%] is acquired by the brake position sensor 34. The shift position Sp is acquired by the shift position sensor 36. The clutch pedal depression amount Pc [%] is acquired by the clutch position sensor 38. Besides, a meaning and a function of each of the blocks shown in FIG. 11 are equal to the meaning and the function of each of the blocks in FIG. 4.

Figure 12:
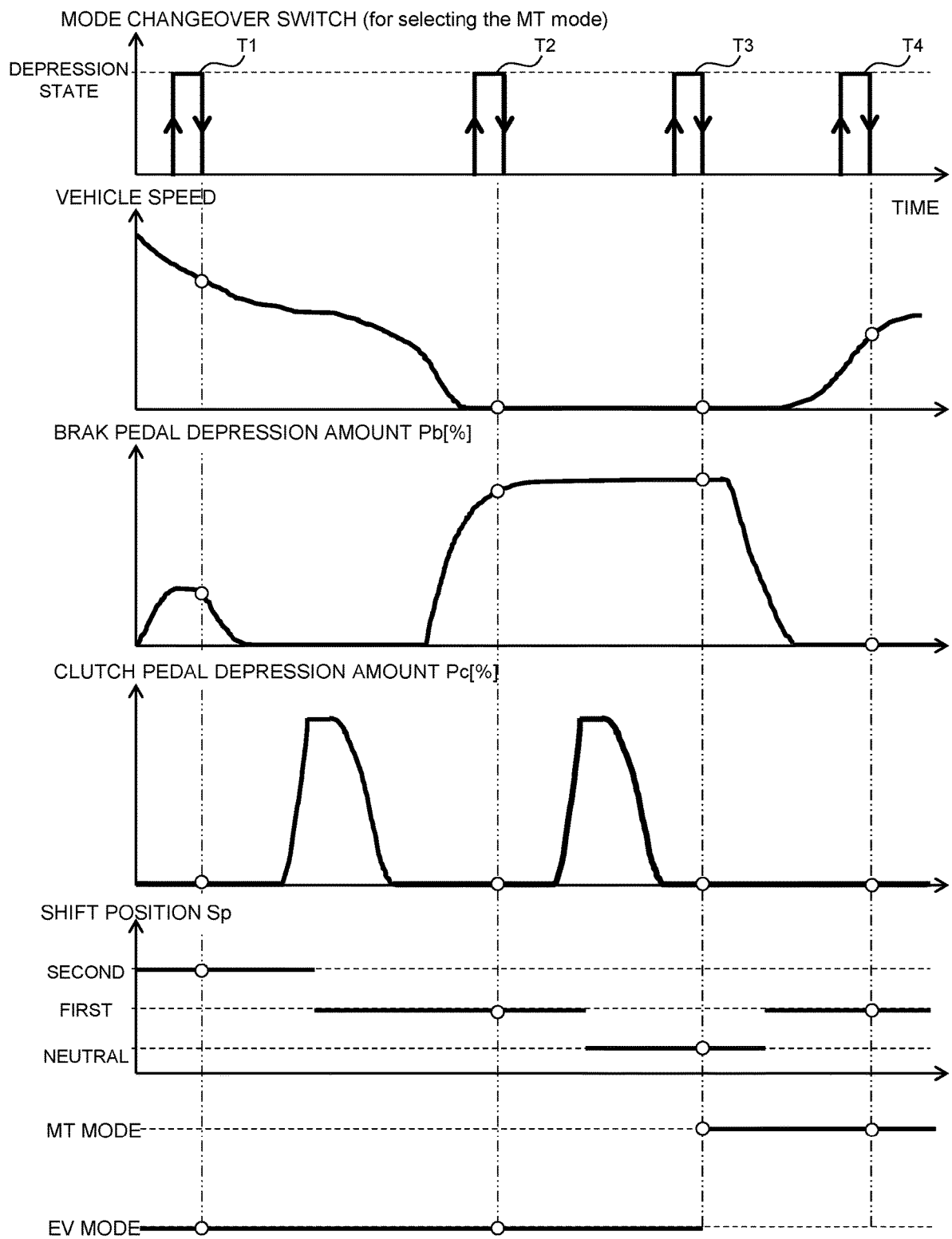
FIG. 12 is a diagram illustrating an outline of a process executed by the processor in the running mode determination unit 500, in the electric vehicle according to the modified present embodiment.

FIG. 12 is a diagram illustrating an outline of a process executed by the processor 56 in the running mode determination unit 500, in the electric vehicle 10 according to the modified present embodiment. The horizontal axis in respective graphs shown in FIG. 12 is a common time axis that mean same time points when distances in the horizontal axis direction are the same.

FIG. 12 illustrates a depression state of the switch for selecting the MT mode of the mode changeover switch 42 (hereinafter, also simply referred to as the "mode changeover switch 42"), a vehicle speed of the own vehicle, the brake pedal depression amount Pb[%], and the clutch pedal depression amount Pc[%], and the running mode determined by the running mode determination unit 500 by respective graphs, in a certain specific time period. At a start time point of the time period shown in FIG. 12, the running mode determination unit 500 determines the running mode as the EV mode. Note that in FIG. 12, it is determined that the switch is pressed at a time point when the depression state of the switch of the mode changeover switch 42 falls, but it may be determined that the switch is pressed at a time point when the depression state rises.

In the time period shown in FIG. 12, the mode changeover switch 42 is pressed four times. Respective pressed timings are referred to as T1, T2, T3, and T4 in order from the earliest time.

In the timing T1, the own vehicle is not in the stopped state, and the shift position Sp is not the neutral position (the conditions C1 and C4 are not satisfied). Accordingly, the running mode remains to be determined as the EV mode.

In the timing T2, the own vehicle is in a stopped state, the brake pedal 24 is operated, and although the pseudo clutch pedal 28 is not operated, the shift position Sp of the pseudo shift lever 26 is not in the neutral position (only the condition C4 is not satisfied). Accordingly, the running mode remains to be determined as the EV mode.

In the timing T3, the own vehicle is in a stopped state, the brake pedal 24 is operated, the pseudo clutch pedal 28 is not operated, and the shift position Sp of the pseudo shift lever 26 is the neutral position (conditions C1 to C4 are satisfied). Accordingly, the running mode is determined as the MT mode.

In the timing T4, the own vehicle is not in a stopped state, the brake pedal 24 is not operated, and the shift position Sp of the pseudo shift lever 26 is not the neutral position (conditions C1, C2 and C4 are not satisfied), but since the running mode is already determined as the MT mode, the running mode remains to be determined as the MT mode.

Though not illustrated, when the switch for selecting the EV mode of the mode changeover switch 42 is pressed, or when the running mode is automatically transferred to the EV mode, the running mode is determined to be the EV mode regardless of whether or not the conditions C1 to C4 are satisfied.

By the modified present embodiment like this, switching to the MT mode by an erroneous operation is reduced, and the own vehicle can be prevented from being unintentionally operated in the MT mode.

Figure 13:
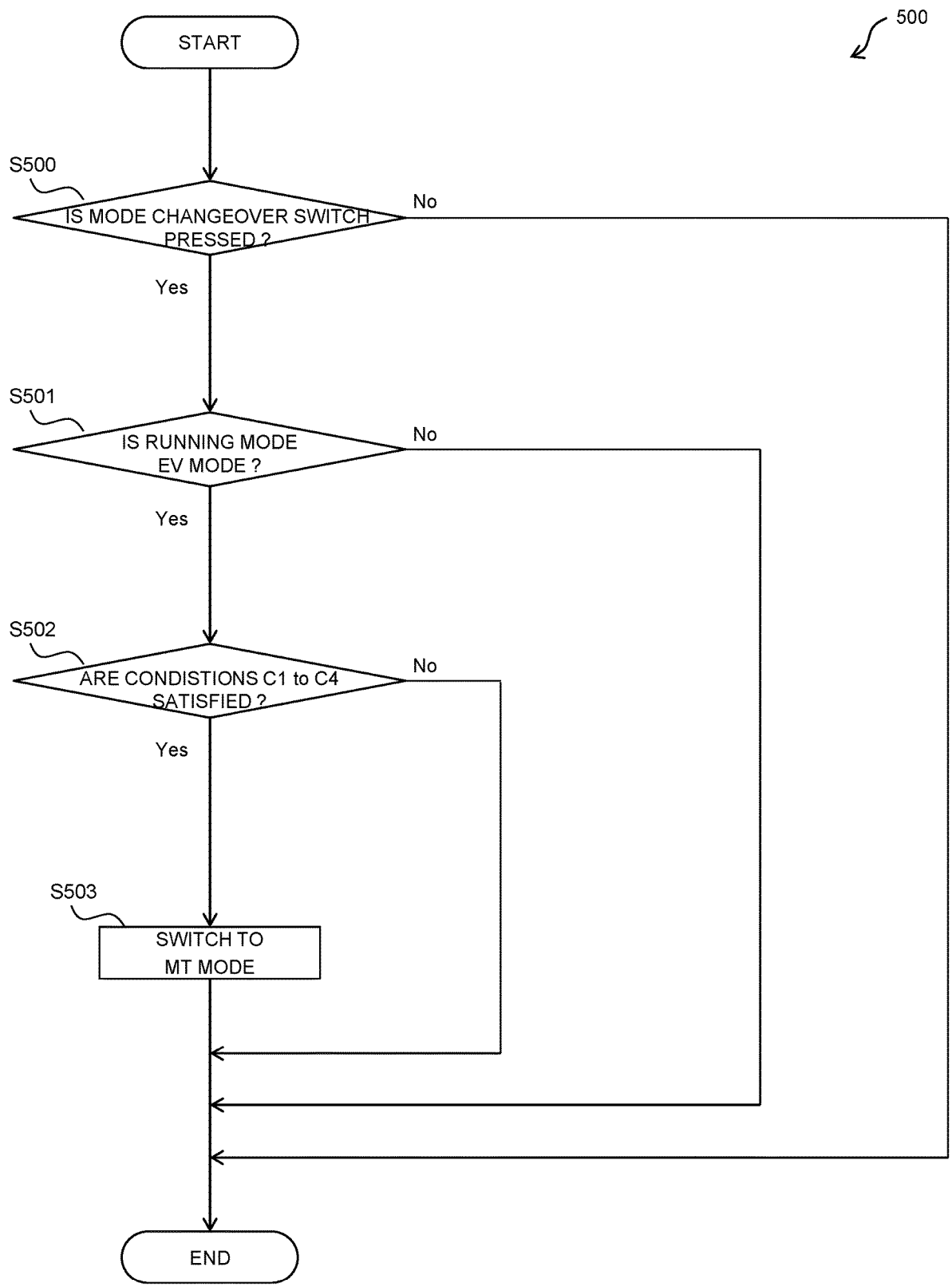
FIG. 13 is a flowchart illustrating a process executed by the processor in the running mode determination unit in the electric vehicle according to the modified present embodiment.

FIG. 13 is a flowchart illustrating a process executed by the processor 56 in the running mode determination unit 500 in the electric vehicle 10 according to the modified present embodiment. The process shown in FIG. 13 is repeatedly executed at a predetermined control period of the control device 50.

In step S500, the processor 56 determines whether or not the switch for selecting the MT mode in the mode changeover switch 42 is pressed. When the switch is in a depressed state in a control period immediately before, but is in a state where it is not pressed at the current control period (depression state falls), it is determined that the switch is pressed. Alternatively, when the switch is in the state where the switch is not depressed at the control period immediately before, and the switch is in the depressed state at the current control period (depression state rises), it may be determined that the switch is pressed. When it is determined that the switch is pressed (step S500; Yes), the process proceeds to step S501. When it is determined that the switch is not pressed (step S500; No), the process is ended.

In step S501, the processor 56 determines whether the running mode that is currently determined is the EV mode or the MT mode. When the running mode that is currently determined is the EV mode (step S501; Yes), the process proceeds to step S502. When the running mode that is currently determined is the MT mode (step S501; No), the process is ended. When the process is ended, the change of the running mode is not performed although the driver operates the mode changeover switch 42. This may cause anxiety for the driver. Therefore, before the process is ended, a process that notifies the driver that change of the running mode is not performed by sound or display may be executed. This can reduce anxiety of the driver.

In step S502, the processor 56 executes the determination process that determines whether or not the conditions C1 to C4 are satisfied. When the conditions C1 to C4 are satisfied (step S502; Yes), the process proceeds to step S503, and the running mode is determined as the MT mode. When the conditions C1 to C4 are not satisfied (step S502; No), the process is ended. Before the process is finished, the process of notifying that the running mode is not changed by sound or display may be executed for the purpose of reducing anxiety of the driver. In this case, which condition is not satisfied may be notified by sound or display.

The invention claimed is:

1. An electric vehicle that uses an electric motor as an engine for running, the electric vehicle comprising:
   an accelerating pedal;
   a pseudo clutch pedal;
   a pseudo shift device;
   a control device that controls motor torque outputted by the electric motor according to a control mode including two modes that are a first mode and a second mode; and
   a mode changeover device that switches the control mode to the first mode by being manually operated,
   wherein the control device includes
      a memory, and
      a processor,
      the memory stores
         an MT vehicle model simulating a torque characteristic of drive wheel torque in an MT vehicle including an internal combustion engine that controls torque by operation of a gas pedal and a manual transmission in which a gear stage is switched by operation of a clutch pedal and operation of a shift device, and
         a motor torque command map that gives the motor torque corresponding to an operation amount of the accelerating pedal and a rotational speed of the electric motor, and
      the processor executes
      when controlling the electric motor in the first mode,
         a process in which the operation amount of the accelerating pedal is accepted as an input of an operation amount of the gas pedal to the MT vehicle model,
         a process in which an operation amount of the pseudo clutch pedal is accepted as an input of an operation amount of the clutch pedal to the MT vehicle model,
         a process in which a shift position of the pseudo shift device is accepted as an input of the shift device to the MT vehicle model,
         a process in which the drive wheel torque is calculated based on the MT vehicle model from the operation amount of the accelerating pedal, the operation amount of the pseudo clutch pedal, and the shift position of the pseudo shift device, and
         a process in which the motor torque for giving the drive wheel torque to drive wheels of the electric vehicle is calculated,
      when controlling the electric motor in the second mode, executes
         a process in which operation of the pseudo clutch pedal and operation of the pseudo shift device are disabled, and a process in which the motor torque is calculated based on the operation amount of the accelerating pedal and the rotational speed of the electric motor by the motor torque command map.

2. The electric vehicle according to claim 1, further comprising:
a braking pedal,
wherein the shift position of the pseudo shift device includes
a neutral position specifying that the torque characteristic in a neutral state where a clutch of the MT vehicle is not connected with the manual transmission is simulated by the MT vehicle model,
the processor executes,
when the control mode is not the first mode,
a determination process which determines whether or not the electric vehicle is in a stopped state, the braking pedal is operated, the pseudo clutch pedal is not operated, and the shift position of the pseudo shift device is the neutral position, and
a process which rejects switching the control mode to the first mode by the mode switching device while a result of the determination process is negative.

* * * * *